(12) United States Patent
Endo et al.

(10) Patent No.: US 7,381,963 B2
(45) Date of Patent: Jun. 3, 2008

(54) RADIATION IMAGING APPARATUS, RADIATION IMAGING SYSTEM, AND PROGRAM

(75) Inventors: Tadao Endo, Honjo (JP); Toshio Kameshima, Kumagaya (JP); Tomoyuki Yagi, Honjo (JP); Katsuro Takenaka, Kodama-gun (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/535,726

(22) Filed: Sep. 27, 2006

(65) Prior Publication Data

US 2007/0080299 A1 Apr. 12, 2007

(30) Foreign Application Priority Data

Sep. 30, 2005 (JP) ............................. 2005-288418

(51) Int. Cl.
*G01T 1/24* (2006.01)
(52) U.S. Cl. .............................. 250/370.09; 250/370.11; 348/220.1; 378/98.9; 378/114; 382/270
(58) Field of Classification Search ...................... None
See application file for complete search history.

(56) References Cited

U.S. PATENT DOCUMENTS

| | | | |
|---|---|---|---|
| 5,920,070 A * | 7/1999 | Petrick et al. .......... | 250/370.09 |
| 6,185,274 B1 | 2/2001 | Kinno et al. ............... | 378/98.8 |
| 6,353,229 B1 * | 3/2002 | Polischuk et al. ..... | 250/370.14 |
| 6,952,015 B2 | 10/2005 | Kameshima ........... | 250/370.11 |
| 6,952,464 B2 | 10/2005 | Endo ....................... | 378/98.11 |
| 6,985,555 B2 | 1/2006 | Endo ....................... | 378/98.11 |
| 7,002,157 B2 | 2/2006 | Kameshima ........... | 250/370.11 |
| 7,012,260 B2 | 3/2006 | Endo ....................... | 250/370.11 |
| 7,075,090 B2 | 7/2006 | Endo ....................... | 250/370.11 |
| 7,138,639 B2 | 11/2006 | Kameshima ........... | 250/370.11 |
| 7,154,099 B2 | 12/2006 | Endo ....................... | 250/370.11 |
| 7,227,926 B2 | 6/2007 | Kameshima et al. ....... | 378/98.9 |
| 2002/0191828 A1 * | 12/2002 | Colbeth et al. ............. | 382/132 |
| 2005/0109927 A1 | 5/2005 | Takenaka et al. ......... | 250/252.1 |
| 2005/0199834 A1 | 9/2005 | Takenaka et al. ........... | 250/580 |
| 2005/0200720 A1 | 9/2005 | Kameshima et al. ..... | 348/220.1 |

(Continued)

OTHER PUBLICATIONS

"Processor" Microsoft Computer Dictionary, Fifth Edition, 2002, Microsoft Corporation, p. 132.*

*Primary Examiner*—David P. Porta
*Assistant Examiner*—Yara B Green
(74) *Attorney, Agent, or Firm*—Fitzpatrick, Cella, Harper & Scinto

(57) ABSTRACT

It is made possible that, in accordance with a plurality of radiographing modes such as the still image radiographing mode and the moving image radiographing mode, the outputs both in the irradiation period and in the non-irradiation period are made to fall within the dynamic range of the radiographing system, whereby an accurate, high-S/N-ratio X-ray radiographic image is obtained. For that purpose, in accordance with the plurality of radiographing modes, an arithmetic operation unit adjusts a power source to control voltage to be applied to a reading circuit unit or an Analogue-Digital conversion unit, such that, in each of the radiographing modes, both an electric signal in the X-ray irradiation period and an electric signal in the X-ray non-irradiation period fall within the dynamic ranges of the reading circuit unit and the Analogue-Digital conversion unit.

12 Claims, 9 Drawing Sheets

U.S. PATENT DOCUMENTS

| | | | |
|---|---|---|---|
| 2005/0220269 A1 | 10/2005 | Endo et al. | 378/114 |
| 2005/0238249 A1* | 10/2005 | Okamura | 382/274 |
| 2005/0264665 A1 | 12/2005 | Endo et al. | 348/308 |
| 2006/0119719 A1 | 6/2006 | Kameshima | 348/308 |
| 2006/0131507 A1* | 6/2006 | Rahn | 250/370.09 |
| 2006/0146159 A1* | 7/2006 | Farrier | 348/308 |
| 2006/0192130 A1 | 8/2006 | Yagi | 250/370.14 |
| 2006/0289774 A1 | 12/2006 | Endo et al. | 250/370.09 |
| 2007/0040099 A1 | 2/2007 | Yokoyama et al. | 250/208.1 |
| 2007/0069144 A1 | 3/2007 | Kameshima | 250/370.09 |
| 2007/0096032 A1 | 5/2007 | Yagi et al. | 250/370.11 |
| 2007/0125952 A1 | 6/2007 | Endo et al. | 250/369 |
| 2007/0131843 A1 | 6/2007 | Yokoyama et al. | 250/205 |
| 2007/0183573 A1 | 8/2007 | Kameshima et al. | 378/98.9 |
| 2007/0187609 A1* | 8/2007 | Karim | 250/370.09 |

* cited by examiner

RADIATION IMAGING APPARATUS, RADIATION IMAGING SYSTEM, AND PROGRAM

BACKGROUND OF THE INVENTION

1. Field of the Invention

The present invention relates to a radiation imaging apparatus, a radiation imaging system, and a program that are suitably used, e.g., in medical diagnosis, industrial non-destructive inspection, and the like. In addition, in the present specification, it is assumed that "radiations" include electromagnetic waves, such as an X-ray, and a γ-ray, an α-ray, and a β-ray.

2. Description of the Related Art

Radiation imaging systems that have been installed in hospitals, clinics, or the like are categorized into an analogue and a digital radiographing method. In the analogue radiographing method, radiations such as X-rays are irradiated onto a patient and a film is exposed by the radiations that have passed through the patient. In the digital radiographing method, radiations that have passed through the patient are converted into electric signals, i.e., digital data so as to obtain image data.

The digital radiographing method includes the CR (Computed Radiography) method and the FPD (Flat Panel Detector) method. In the CR method, a radiation image is temporarily stored in photostimulable phosphors made mainly of BaFBr, and then scanned by a laser beam so as to obtain digital data. In the FPD method, radiations that have passed through the patient are converted into visible light, by means of a scintillator such as $Gd_2O_2S$:Tb or CsI:Tl; then, the visible light is converted into an electric signal, by means of a photoelectric conversion element made mainly of amorphous silicon semiconductor. In addition, some of FPD-method radiation imaging apparatuses utilize, instead of a scintillator, a conversion device, made of, e.g., amorphous selenium, that converts radiations directly into an electric signal. The former and the latter are referred to as the indirect and the direct FPD, respectively.

In recent years, it has been desired that moving imaging, e.g., gastric fluoroscopic radiographing, angiographing during operation, and the like, which have been implemented by means of an image intensifier (I.I.), are carried out by means of the FPD. That is because, while the I.I. has problems of fringe-portion image distortion, halation in the case of irradiating strong radiations, and sensitivity deterioration due to long-term use, the FPD does not pose such problems and, in recent years in particular, has become relatively inexpensive to produce. In addition, although, as an apparatus that can be digitized, the CR-method apparatus has become widespread since 1980, it poses, in operational principle, some disadvantage in radiographing a moving image. In other words, it is conceivable that the FPD method, which has functions of both the CR method for still images and the I.I. method for moving images, becomes a mainstream in digitization in medicine in the future. The FPD-method digitization largely improves hospital workflows and facilitates the recording and printing of radiographic data; in addition to that, the FPD-method digitization can considerably contribute to improvement of diagnosis efficiency, by making full use of an advanced computer-aided image processing technique. In the second half of 1990, upright type and decubitus type radiation imaging apparatuses were marketed in which the FPD method were employed, and in recent years, X-ray imaging apparatuses capable of radiographing moving images have been proposed and marketed.

SUMMARY OF THE INVENTION

In the case of moving image radiographing (fluoroscopic radiographing), a patient is subjected to irradiation with radiation for a longer period of time than in the case of still image radiographing. It is desired to reduce a quantity of exposure to the radiation to avoid harm to the patient. Accordingly, an improvement in the sensitivity of the Flat Panel Detector would be required.

U.S. Pat. No. 7,075,090 discloses an example in which the relationship between the gain (Gf), set in a reading circuit unit, for a moving image radiographing mode and the gain (Gs), set in the reading circuit unit, for a still image radiographing mode is given by Gf>Gs. That is because, in consideration of random noise produced in and after a gain setting circuit, the gain for a moving image radiographing mode is enhanced so as to raise the SNR of the FPD.

In addition, U.S. Pat. No. 6,185,274 discloses a configuration in which, because the signal quantity changes in accordance with the radiographing mode, gains are changed by effectively utilizing the dynamic range of an A/D converter so that the S/N ratio of a detected image is raised. Additionally, in the patent literature 2, an integral amplifier is employed as a signal detecting amplifier and the integral capacitance are changed, because the electric-charge amounts in the DSA mode and in the fluoroscopic mode differ from each other even to the extent of three orders. The patent literature 2 also discloses that, in the case where it is difficult to finely adjusting the capacitance values, the gain at a stage after the integral amplifier can finely be adjusted. In the patent literature 2, the changing of the integral-amplifier capacitance and the changing of the gain at a stage after the integral amplifier are separately described in wording; however, it is conceivable that the changing of signal levels through changing of the capacitance suggests the same meaning as the changing of the gain.

Additionally, in general, in moving image radiographing utilizing a large-area FPD, pixel-binding drive is implemented so as to raise the frame rate. In the case of U.S. Pat. No. 6,185,274, the resistance and the capacitance of the scanning lines for driving switching elements cause the delay and waveform distortion in a scanning-line driving signal. Accordingly, normal drive does not enable the frame rate required for a cardiovascular diagnosis system (moving image radiographing); therefore, the frame rate is raised by driving a plurality of scanning lines at one time (pixel-binding drive).

In general, depending on the radiographing mode, e.g., the moving image mode, the still image mode, or the like, the amount of radiations, i.e., the signal quantity from the FPD changes; a method is known in which, in a radiographing mode with a small signal, the gain in the reading circuit unit is changed. For example, U.S. Pat. No. 6,185,274 explains that the electric-charge amounts in the DSA mode and in the fluoroscopic mode differ from each other even to the extent of three orders; thus, if the gain is set at high level, the following problems are produced:

(1) The respective input offset voltages and input offset currents of the operational amplifiers, in the reading circuit unit, for corresponding channels differ from one another; therefore, the outputs at dark of corresponding channels vary from one another (offset variation at dark).

(2) In the radiation-imaging circuit unit, the respective sensor dark currents, capacitances (Cgs) between the gate electrodes and the source electrodes of the switching elements, leakage currents between the sources and the drains of the switching elements, and the like for corresponding pixels vary from one another. Accordingly, the outputs at dark of corresponding channels vary from one another (offset variation at dark).

In particular, the gain is set at a high level so as to compensate the three-order difference, in the electric-charge amounts, between the DSA mode and the fluoroscopic mode, the relationship between the offset variation at dark (Voff) and the signal quantity (Vsig) is given by the following equation, although depending on the design of the reading circuit unit:

$$Voff \approx Vsig, \text{ or } Voff > Vsig.$$

FIG. 10 is a characteristic graph for explaining the foregoing problems. In the case where, as illustrated in FIG. 10, the gain is set at a high level, the offset variation at dark (Voff) becomes large enough to deviate from the dynamic range of the reading circuit unit, producing erroneous pixels. Alternatively, although being not illustrated, the offset variation at dark may exceed the dynamic range of an A/D converter arranged after the reading circuit unit, even though being within the dynamic range of the reading circuit unit. If these inconveniences occur, radiation-image information cannot be obtained correctly.

In addition, the foregoing problems are not necessarily posed only when the gain is set at a high level. In the moving image radiographing mode utilized in cardiovascular diagnosis, the frame rate is raised by use of the pixel-binding drive. In the pixel-binding drive, switching elements in a plurality of lines are driven at one time; therefore, the offset variation at dark, due to the dark current of a radiation imaging element or the capacitance (Cgs) between the gate electrode and the source electrode of a switching element, becomes large inevitably. It goes without saying that, in the pixel-binding drive, the signal quantity increases in proportion to the number of added pixels.

In general, a radiation imaging apparatus for medical use is required to have a high S/N ratio so as to reduce patient exposure. Accordingly, it is desirable that, in a radiographing process, data on the offset output at dark, which is produced in the reading circuit unit and the radiation-imaging circuit unit, is temporarily obtained during the period in which no radiation is irradiated (in the non-irradiation period) and then subtracted from data obtained in the irradiation period. Because the output in the irradiation period is superimposed on the output in the non-irradiation period, i.e., the offset output at dark, acquisition of the output only in the irradiation period does not enable correct radiographing information to be obtained. In particular, in the case where the gain is set at a high level, the radiation signal output in the irradiation period may fall within the dynamic range, even when the offset output at dark is under the lower limit of the dynamic range. It is required that the outputs both in the irradiation period and in the non-irradiation period fall within the dynamic range of the system.

The present invention has been implemented in consideration of the foregoing problems; in accordance with a plurality of radiographing conditions such as the still image radiographing mode and the moving image radiographing mode, the outputs both in the irradiation period and in the non-irradiation period are made to fall within the dynamic range of the radiographing system. In consequence, the object of the present invention is to provide a radiation imaging apparatus, a radiation imaging system, and a program that enable an accurate, high-S/N-ratio radiographed image to be obtained.

A radiation imaging apparatus according to the present invention includes a reading circuit unit for reading an electric signal from a radiation detecting unit that detects radiations, a power source for controlling a voltage applied to the reading circuit unit, and a power control unit for controlling the power source. Here, the radiation imaging apparatus has a plurality of radiographing modes and, the power control unit controls the power source to control the voltage to be applied in accordance with the plurality radiographing modes, such that, both the electric signal in an irradiation period and the electric signal in a non-irradiation period fall within the dynamic range of the reading circuit unit in each of the radiographing modes.

A radiation imaging system according to the present invention includes a radiation source for irradiating radiations, a radiation detecting unit for detecting the radiations, a reading circuit unit for reading an electric signal from the radiation detecting unit, a power source for controlling a voltage applied to the reading circuit unit, and a power control unit for controlling the power source. Here, the radiation imaging system has a plurality of radiographing modes and, the power control unit controls the power source to control the voltage to be applied in accordance with the plurality of radiographing modes, such that both the electric signal in a irradiation period and the electric signal in a non-irradiation period fall within the dynamic range of the reading circuit unit in each of the radiographing modes.

A program, according to the present invention, that can be stored in a storage medium makes a computer implement a procedure in which, in accordance with a plurality of radiographing modes, a voltage, applied to a reading circuit unit, that is controlled by a power source is controlled such that, in the plurality radiographing modes, both an electric signal that, in a irradiation period, is detected by a radiation detecting apparatus and read by a reading circuit unit and an electric signal that, in a non-irradiation period, is detected by the radiation detecting apparatus and read by the reading circuit unit fall within the dynamic range of the reading circuit unit.

The present invention make it possible that, in accordance with a plurality of radiographing conditions such as the still image radiographing mode and the moving image radiographing mode, the outputs both in the irradiation period and in the non-irradiation period are made to fall within the dynamic range of the radiographing system. Accordingly, an accurate, high-S/N-ratio X-ray radiographic image can be obtained. The present invention makes it possible that a single X-ray imaging apparatus freely implements both still image radiographing and moving image radiographing. In the moving image radiographing in particular, even though the gain is raised or the pixel-binding drive is carried out, an excellent image can be obtained. The present invention makes it possible that a single radiation imaging apparatus enables both a moving image and a still image to be radiographed, whereby easy-to-use radiographing can be implemented by a single radiation imaging apparatus.

Further features of the present invention will become apparent from the following description of exemplary embodiments with reference to the attached drawings.

DESCRIPTION OF THE EMBODIMENTS

With reference to the accompanying drawings, preferred embodiments will be explained below in which radiation imaging apparatuses according to the present invention are applied to X-ray radiographing. In addition, the present invention is not limited to X-ray radiographing and applicable to radiographing utilizing an electromagnetic wave such as a γ-ray or any one of various radiations such as an α-ray and a β-ray.

Embodiment 1

Figure 1:
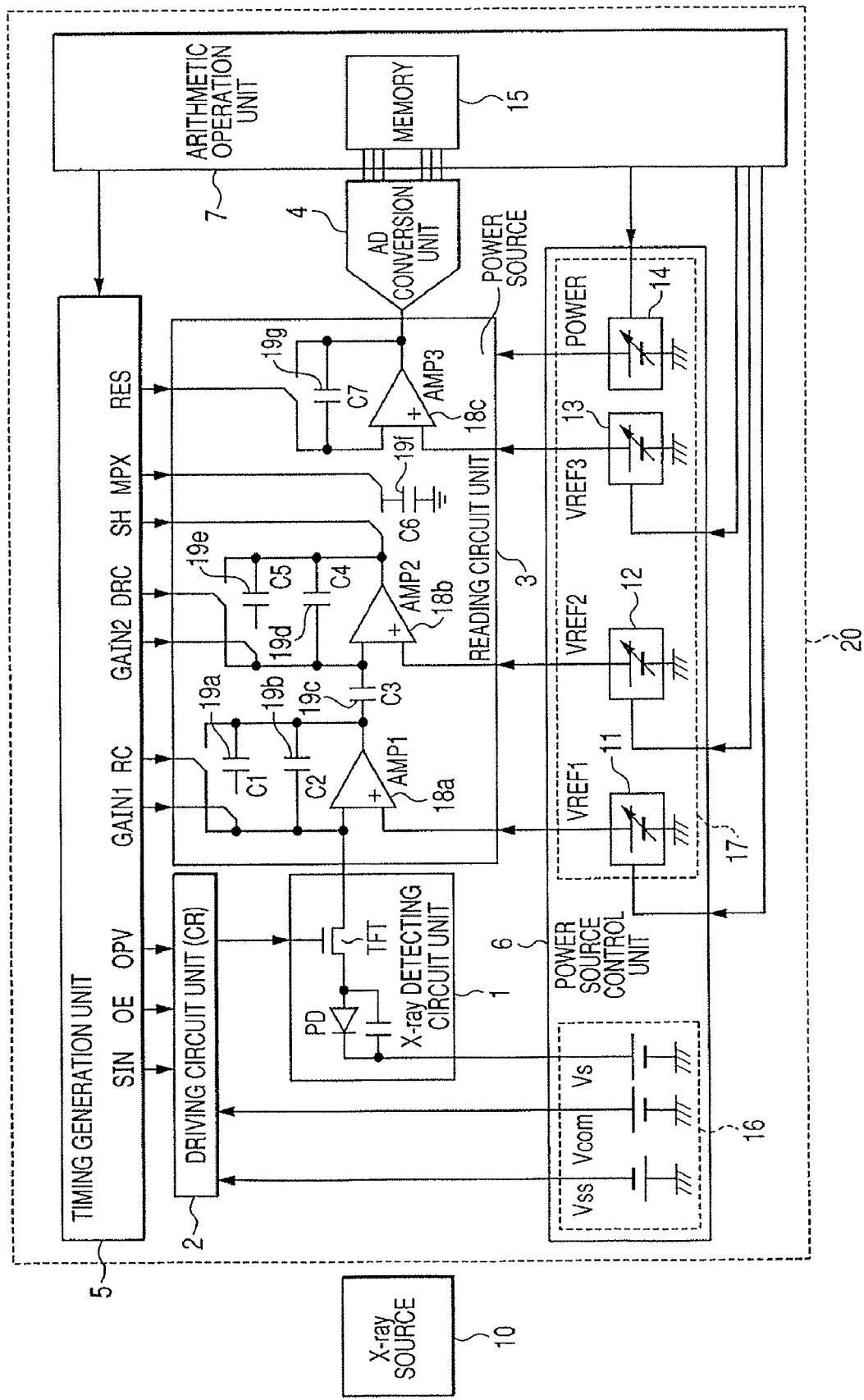
FIG. 1 is a schematic block diagram illustrating an X-ray imaging system according to Embodiment 1 of the present invention.

FIG. 1 is a schematic block diagram illustrating an X-ray imaging system according to Embodiment 1 of the present invention. The X-ray imaging system is configured of an X-ray source 10 for irradiating X-rays onto a subject, an X-ray imaging apparatus 20 for picking up X-rays that have passed through (or that have been reflected by) a subject, and an unillustrated control unit for controlling the drive of the X-ray source 10 and the X-ray imaging apparatus 20.

In the X-ray imaging apparatus 20, Reference Numeral 1 denotes an X-ray detecting circuit unit for detecting X-rays from a subject. The X-ray detecting circuit unit 1 is configured of a plurality of pixels, juxtaposed in a two-dimensional array fashion, that are each made up of an X-ray detecting element (conversion element) and a switching element for selecting the X-ray detecting element. In Embodiment 1, the X-ray detecting element has a photoelectric conversion element, and a thin-film transistor (TFT) is employed as the switching element.

In FIG. 1, as the photoelectric conversion element, a PIN type photo diode (PD) is utilized that is made mainly of an amorphous silicon semiconductor. Additionally, in the photoelectric conversion element, a phosphor is provided as a wavelength conversion device (scintillator) for converting a radiation such as an X-ray into a light ray within a wavelength bandwidth that can be sensed by the photoelectric conversion element. The phosphor is made mainly of any one of $Gd_2O_2S$, $Gd_2O_3$, and CsI. In the present embodiment, as the X-ray detecting element, a direct conversion type X-ray detecting element may be utilized, instead of the photoelectric conversion element, that, without utilizing a wavelength conversion device, absorbs a radiation and converts it into an electric signal. The direct conversion type X-ray detecting element is formed mainly of, e.g., any one material selected among a lead iodide, a mercury iodide, selenium, a cadmium telluride, a gallium arsenide, a gallium phosphide, a zinc sulfide, and silicon.

In addition, a MIS type sensor, made mainly of an amorphous silicon semiconductor, may replace the PIN type photo diode and may be utilized as the photoelectric conversion element. The MIS type sensor is configured of a first metal layer, an insulating layer made of an amorphous silicon nitride, a semiconductor layer made of hydrogenated amorphous silicon, an impurity semiconductor layer, and a second metal layer that are stacked on top of the other. In this situation, the first metal layer functions as a lower electrode, and the second metal electrode functions as an upper electrode. The second metal layer is configured of a transparent conductive layer, a metal layer, and a laminated structure consisting of the transparent conductive layer and the metal layer, and arranged on at least part of the impurity semiconductor layer. The insulating layer prevents an electron and a hole that are produced in the semiconductor layer from passing through the MIS type sensor. The impurity semiconductor layer prevents the implantation of either one of a hole and an electron; for example, an N type impurity that prevents the implantation of a hole is doped in the impurity semiconductor layer.

In the MIS type sensor, in the refresh mode, an electric field is applied to the semiconductor layer in a direction along which hole carriers are introduced from the semiconductor layer into the second metal layer. In contrast, in the photoelectric conversion mode, an electric field is applied to the semiconductor layer in a direction along which hole carriers produced by light rays that enter the semiconductor layer are made to stay in the semiconductor layer and electrons are introduced into the second metal layer. Next, the holes accumulated in the semiconductor layer, or the electrons introduced into the second metal layer, during the photoelectric conversion mode are detected as a light signal.

In general, a TFT is formed mainly of amorphous silicon. An electric signal obtained through the photoelectric conversion by the PD is transferred by the TFT to a reading circuit unit 3. A pair of PD and TFT forms a pixel, and the pixels are juxtaposed in a two-dimensional fashion. For example, a radiographing area of 43 cm by 43 cm is wide enough to obtain the fluoroscopic image for a human chest; in the case where the image is configured of 160 μm-pitch pixels, the number of pixels is approximately 7.2 million. In general, a TFT is formed mainly of amorphous silicon; however, the present invention is not limited to a TFT formed of amorphous silicon, and a non-monocrystal semiconductor, such as a polysilicon, provided on an insulating substrate is also suitably utilized in the present invention.

Reference Numeral 2 denotes a driving circuit unit 2 for driving the X-ray detecting circuit unit 1. Reference Numeral 3 denotes a reading circuit unit for reading an electric signal from the X-ray detecting circuit unit 1. The reading circuit unit 3 is configured of the first stage, the second stage, and the third stage that are operational amplifiers (AMP 18a to 18c) and connected in cascade. The non-inversion input terminals (+terminals) of the AMP 18a to 18c are biased to respective reference electric potentials. In order to raise the S/N ratio (referred to as SNR, hereinafter) of the X-ray imaging apparatus, noise-reducing design is carried out, especially for the AMP 18a. The AMP 18 is an integral circuit in which capacitors C19a and C19b are connected between the inversion input terminal (−terminal) and the output terminal; by means of a signal GAIN 1, the integral capacitance is selected between a capacitance value C2 and a capacitance value (C1+C2).

In still image radiographing, it is required to obtain, with one-time radiographing, image information on a lung field through which radiations can readily pass and a mediastinum or an abdomen through which radiations cannot readily pass; therefore, it is necessary to irradiate relatively large amount of X-rays so as to expose shadows thereof on a single image. Accordingly, a switch is turned ON by GAIN 1 so as to enlarge the integral capacitance. In contrast, in moving image radiographing, X-rays are irradiated for a long time, compared to the still image radiographing; therefore, in view of reduction of patient exposure, the amount of X-rays per frame (acquisition of one sheet of image information) needs to be reduced. Accordingly, in the case of the moving image radiographing, the integral capacitance is set at a small value so as to raise the output-voltage value of the AMP 18a.

A capacitor 19c is connected between the output terminal of the AMP 1 and the inversion input terminal (−terminal) of the AMP 2; capacitors 19d and 19e are connected between the output terminal and the inversion input terminal (−terminal) of the AMP 2. By means of a signal GAIN 2, the integral capacitance is selected between a capacitance value C4 and a capacitance value (C4+C5). In the case where the capacitance value C4 is selected, the output of the AMP 18b is equal to the multiplication of the output of the AMP 18a by (−C4/C3). In the case where the capacitance value (C4+C5) is selected, the output of the AMP 18b is equal to the multiplication of the output of the AMP 18a by (−(C4+C5)/C3).

Next, the output of the AMP 18b is sample-held on a capacitor 19f, by means of a sample-hold signal SH. Next, the signal sample-held on the capacitor 19f is outputted via the AMP 18c to an Analogue-Digital conversion unit 4, by means of a multiplexer signal MPX.

Reference Numeral 4 denotes the Analogue-Digital conversion unit for applying A/D-conversion to an electric signal from the reading circuit unit 3. In FIG. 1, for simplicity, only part of the X-ray imaging system, corresponding to one pixel is illustrated and one Analogue-Digital conversion unit 4 is illustrated for one pixel; however, in effect, one Analogue-Digital conversion unit 4 implements A/D-conversion for a great number of pixels. For instance, parallel signal processing is implemented until the switch where the multiplexer signal MPX is inputted, and then parallel-to-serial conversion is implemented. Reference Characters RC, DRC, and RES denote reset signals for the AMP 18a, the AMP 18b, and the AMP 18c, respectively.

Figure 2:
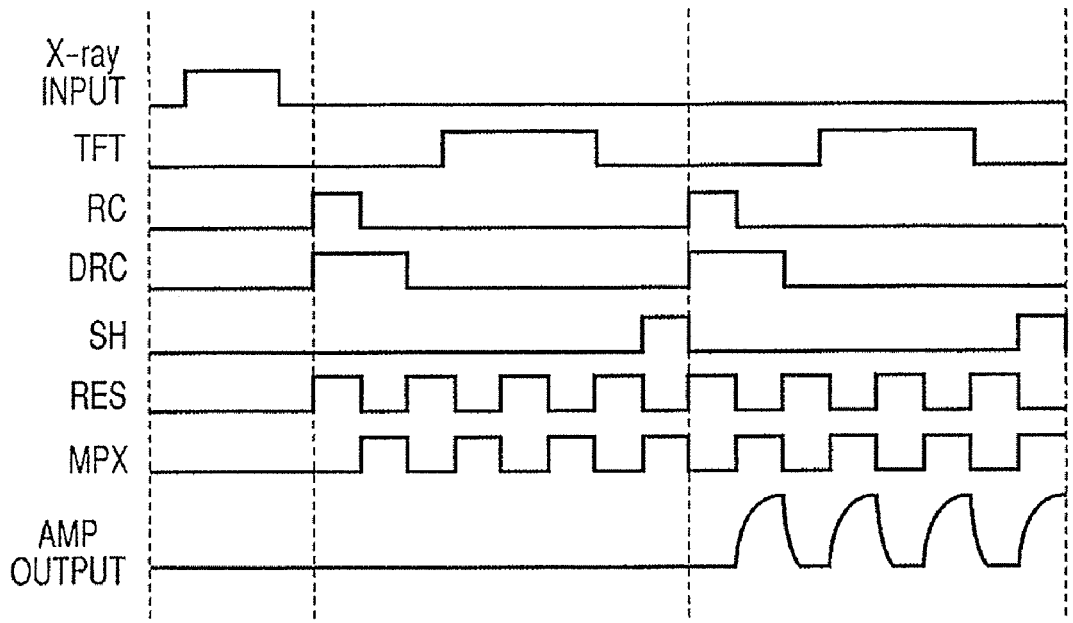
FIG. 2 is a timing chart representing examples of various kinds of operation pulses in an X-ray imaging system according to Embodiment 1 of the present invention.

Reference Numeral 5 denotes a timing generation unit for supplying the driving circuit unit 2 and the reading circuit unit 3 with operation pulses. Here, FIG. 2 represents an example of a timing chart for various types of operation pulses to be supplied from the timing generation unit 5 to the driving circuit unit 2 and the reading circuit unit 3. FIG. 2 represents the timing in the case where parallel-to-serial conversion is implemented for four pixels. Here, the timing among the operation pulse for the TFT and operation pulses RC, DRC, SH, RES, and MPX are represented with respect to an X-ray input. The output of the Analogue-Digital conversion unit 4 is concurrently represented at the bottom portion of FIG. 2. Signals SIN, OE, and OPV are supplied from the timing generation unit 5 to the driving circuit unit 2; based on these signals, the operation pulse for the TFT is supplied from the driving circuit unit 2 to the TFT.

Reference Numeral 6 denotes a power source for controlling voltages to be supplied to the X-ray detecting circuit unit 1, the driving circuit unit 2, and the reading circuit unit 3. The power source 6 is configured of a constant-voltage application unit 16 for applying predetermined constant voltages to the X-ray detecting circuit unit 1 and the driving circuit unit 2 and a variable-voltage application unit 17 for applying variable voltages to the reading circuit unit 3. The constant-voltage application unit 16 applies Vs to the PD of the X-ray detecting circuit unit 1 and Vss and Vcom to the driving circuit unit 2, respectively. The variable-voltage application unit 17 applies VREF1 to the non-inversion input terminal (+terminal) of the AMP 18a in the reading circuit unit 3, VREF2 to the non-inversion input terminal (+terminal) of the AMP 18b, and VREF3 to the non-inversion input terminal (+terminal) of the AMP 18c, respectively. Here, the power source units for applying VREF1, VREF2, and VREF3 are referred to as variable power sources 11, 12, and 13, respectively. Additionally, the power source unit for applying a power supply voltage to the reading circuit unit 3 is referred to as a variable power source 14.

Reference Numeral 7 denotes an arithmetic operation unit (power control unit) for adjusting the timing generation unit 5 and the power source 6. The radiographic image data that has been digitized in the Analogue-Digital conversion unit 4 is inputted to the arithmetic operation unit 7. The arithmetic operation unit has a memory 15 in which the A/D-converted radiographic image data or computed data is stored. The arithmetic operation unit 7 is configured of, e.g., the memory 15 and a DSP; it is desirable that the arithmetic operation unit 7 can process various data items at high speed. In addition, in the present embodiment, the arithmetic operation unit 7 has been explained as a constituent element of the X-ray imaging apparatus 20; the arithmetic operation unit 7 may be an external constituent element, of the X-ray imaging apparatus 20, that is included in the X-ray imaging system.

When determining that at least one of the minimal value of the output at dark or the maximal value of the output at light deviates from the dynamic ranges of the reading circuit unit 3 and the Analogue-Digital conversion unit 4, the arithmetic operation unit 7 gives feedback to the power source 6. In other words, based on the amount of the deviation, the arithmetic operation unit 7 computes an appropriate value with which the maximal and minimal values fall within the dynamic ranges, and feeds back the computed value to the power source 6. As the feedback items, the reference electric potentials VREF1 to VREF3 that are connected to the respective non-inversion input terminals (+terminals) of the AMP 18a, the AMP 18b, and the AMP 18c or the power supply voltage of the reading circuit unit is varied. In other words, when the maximal value of the electric signal (output at light), in the irradiation period, of the X-ray detecting circuit unit 1 or the minimal value of the electric signal (output at dark) in the non-irradiation period does not fall within the dynamic ranges of the reading circuit unit 3 and the Analogue-Digital conversion unit 4, the reference electric potentials or the power supply voltage is varied.

Figure 3:
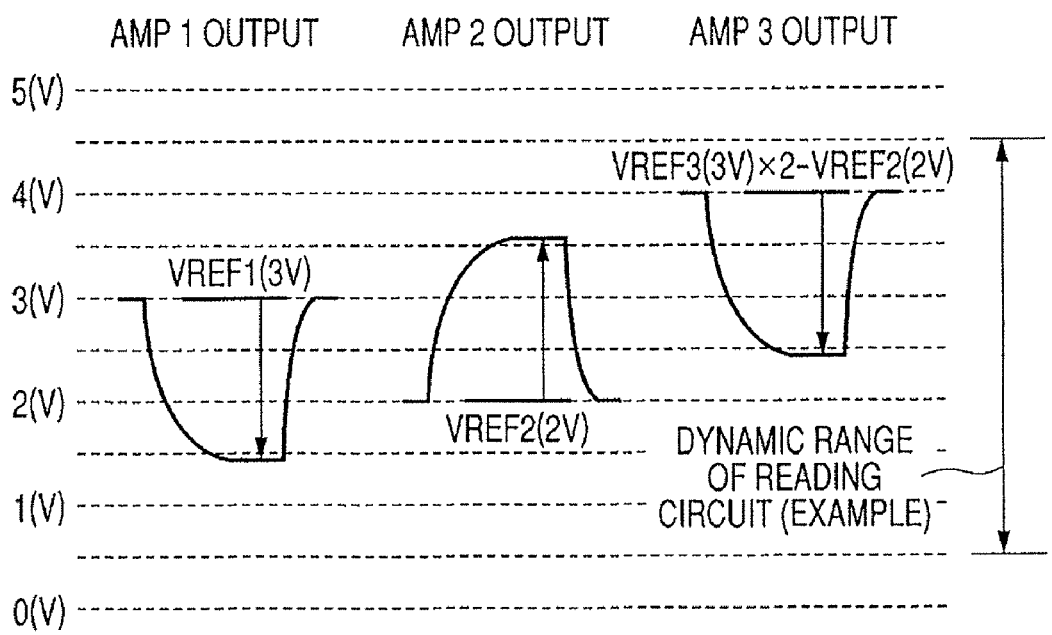
FIG. 3 is a characteristic chart symbolically representing the analogue outputs of various kinds of amplifiers that are constituent elements of a reading circuit unit in FIG. 1.

FIG. 3 is a characteristic chart symbolically representing the analogue outputs (described "AMP1, AMP2, and AMP3)

of the AMP18a, AMP18b, and AMP18c that are constituent elements of the reading circuit unit 3 in FIG. 1. In FIG. 3, the ordinate suggests voltage, but the abscissa does not suggest time. The non-inversion input terminals (+terminals) of the AMP 18a, the AMP 18b and the AMP18c are biased to respective reference electric potentials VREF1, VREF2, and VREF3. FIG. 3 represents the analogue outputs in the case where VREF1=3V, REF2=2V, and VREF3=3V. In addition, FIG. 3 represents examples of the outputs in the case where an electric current flows into the reading circuit unit 3 as the X-rays are detected (the TFT is turned ON).

Signal charges obtained through the photoelectric conversion by the PD in the X-ray detecting circuit unit 1 is transferred to the AMP 18a; the AMP 18a integrates the charges and outputs a voltage signal. In this situation, the non-inversion input terminal (+terminal) of the AMP 18a is biased to the reference electric potential VREF1 (3 V); the output of the AMP 18a is outputted with respect to the level of VREF1 (3 V). Letting Cf and Qsig denote the capacitance between the inversion input terminal and the output terminal of the AMP 18a and the signal charge, respectively, the output of the AMP 18a is given by the following equation: In this regard, however, Cf is switched by means of GAIN1. The output of the AMP 18a=VREF1−(Qsig/Cf).

The non-inversion input terminal (+terminal) of the AMP 18b is biased to the reference electric potential VREF2 (2 V); the output of the AMP 18b is outputted with respect to the level of VREF2 (2 V). The amplification factor (GAIN) of AMP2 is determined by the capacitance (C3) of the capacitor 19c connected between the output terminal of the AMP 18a and the inversion input terminal (−terminal) of the AMP 18b and the capacitances (C4 and C5) of the capacitors 19d and 19e connected between the output terminal and the inversion input terminal (−terminal) of the AMP 18b. The output of the AMP 18b=VREF2+(Qsig/Cf)×GAIN.

By means of GAIN 2, GAIN is switched between C3/C4 and C3/(C4+C5). In FIG. 3, the analogue outputs are represented on the assumption that GAIN=1. The output of the AMP 18b is sample-held on a capacitor 19f.

The non-inversion input terminal (+terminal) of the AMP 19c is biased to the reference electric potential VREF3 (3 V); after the capacitor 19g (capacitance C7) is preliminarily reset, the signal is transferred as a NPX signal. The law of conservation of electric charge yields the following equation:

$$C7\times(AMP3-VREF3)=C6\times(VREF3-AMP2)$$

Assuming that C6 and C7 have the same capacitance, the following equation is given:

The output of the AMP 19c=2×VREF3−VREF2−Qsig/Cf.

In FIG. 3, the analogue outputs are represented on the assumption that C6 and C7 have the same capacitance.

As a result, the output levels of the AMP 18a, the AMP 18b, and the AMP 18c (described as AMP 1, 2, 3 in the table) are as represented in Table 1. In other words, with regard to the outputs in the examples in FIG. 3, the level of the output at dark is determined by the reference electric potential VREF2 of the AMP 18b and the reference electric potential VREF3 of AMP3; the level of the output at light is determined by the capacitors 19a and 19b (capacitance Cf) of the AMP 18a and the charges obtained through photoelectric conversion by the X-ray detecting circuit unit.

|  | OUTPUT OF AMP1 | OUTPUT OF AMP2 | OUTPUT OF AMP3 |
|---|---|---|---|
| DARK-LEVEL OUTPUT | VREF1 | VREF2 | 2 · VREF3 − VREF2 |
| SIGNAL AMPLITUDE | $-\left(\frac{1}{Cf}\times Qsig\right)$ | $\left(\frac{1}{Cf}\cdot Qsig\times Gain\right)$ | $-\left(\frac{1}{Cf}\cdot Qsig\cdot Gain\right)$ |

Figure 4:
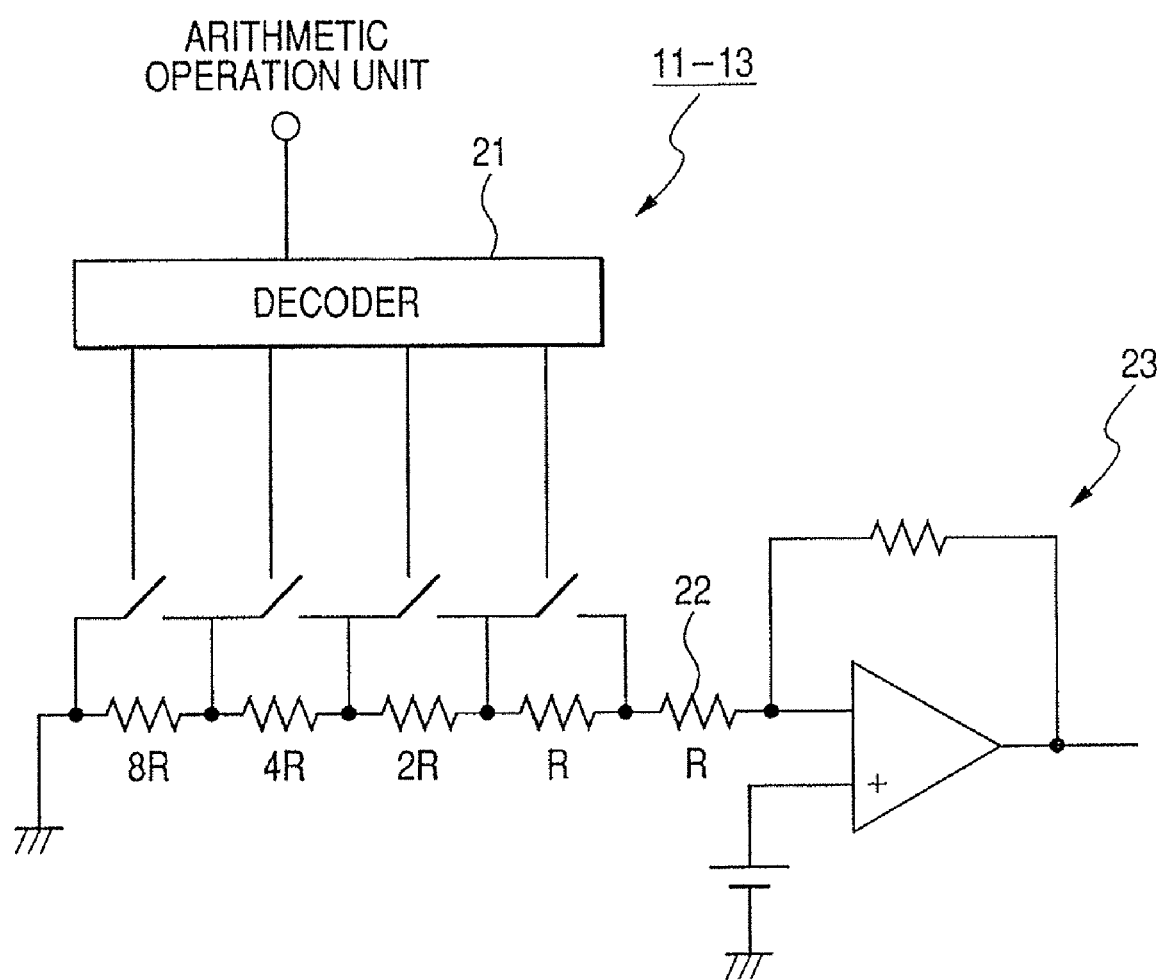
FIG. 4 is a circuit configuration diagram illustrating an example of the configuration of a circuit that generates each reference electric potential in a power source according to Embodiment 1.

FIG. 4 is a circuit configuration diagram illustrating an example of the configuration of the circuit that generates each reference electric potential in the power source 6 according to Embodiment 1. The example illustrates the configuration of the variable power sources 11 to 13 in the power source 6. A control signal from the arithmetic operation unit 7 is converted by a decoder 21 and selects the value of resistors connected to the inversion input terminal of an operational amplifier 23. In the example in FIG. 4, 16 different voltages are available, by means of four types of resistors 22.

Figure 5:
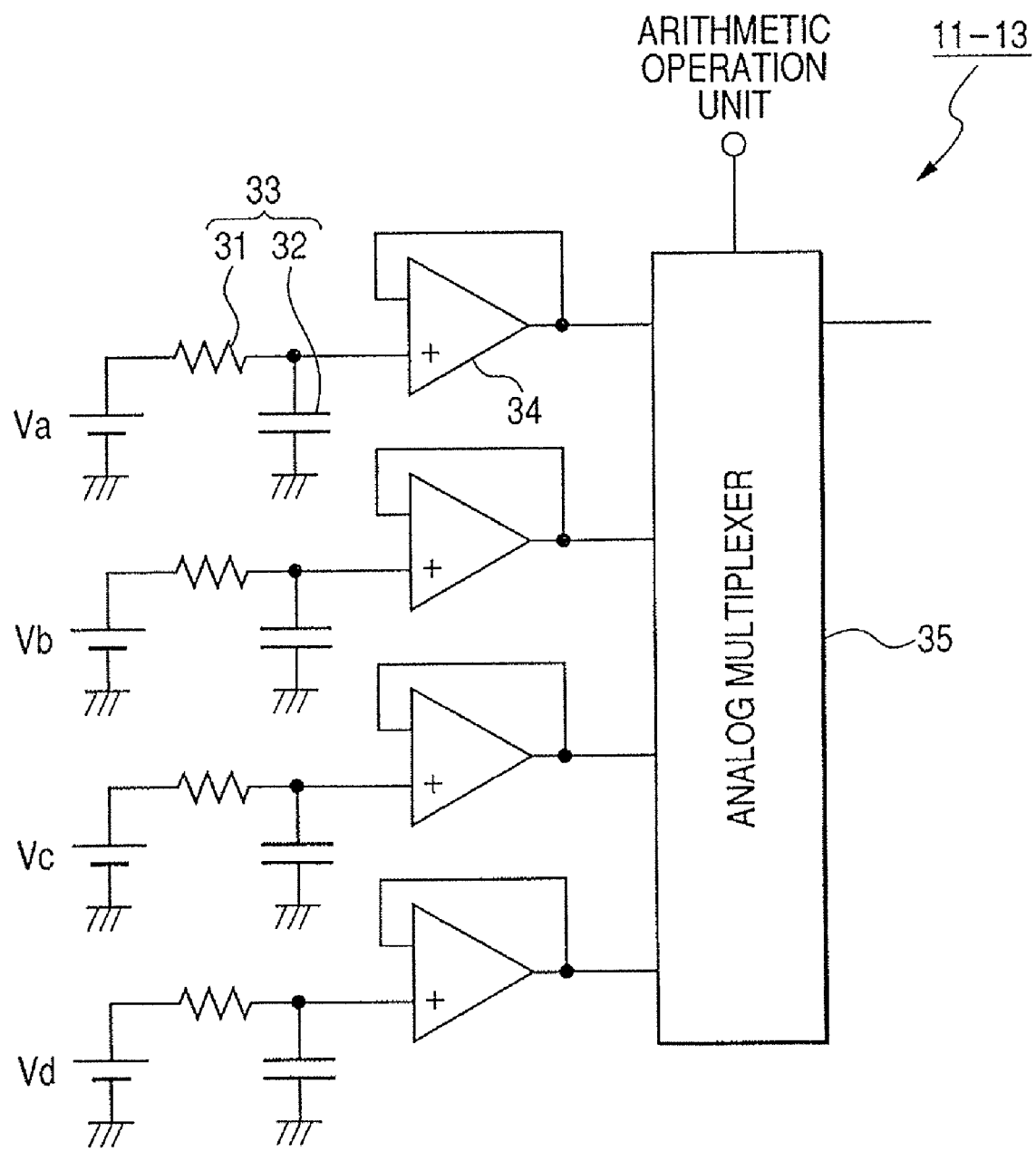
FIG. 5 is a circuit configuration diagram illustrating another example of the configuration of a circuit that generates each reference electric potential in a power source according to Embodiment 1.

FIG. 5 is a circuit diagram illustrating another example of the configuration of the circuit that generates each reference electric potential in the power source 6 according to Embodiment 1 of the present invention. As is the case with the example in FIG. 4, this example illustrates the configuration of the variable power sources 11 to 13 in the power source 6. In the case where, as illustrated in FIG. 4, the value of resistors is selected, the reference electric potential may include noise, due to thermal noise of the resistors 22, whereby the picture quality may be deteriorated. In FIG. 5, an original power supply (Va to Vd) that forms the electric potential of the reference power supply is inputted to an operational amplifier 34, by way of a one-dimensional lowpass filter consisting of a resistor 31 and a capacitor 32, and then outputted from the operational amplifier 34 to an analogue multiplexer 35. If a low-noise operation amplifier is selected as the operation amplifier 34, the reference electric potential contains less noise, whereby the image quality is enhanced. In the circuit in FIG. 5, the reference electric potential can be selected from the four types of reference electric potentials, i.e., Va to Vd, by means of a selection signal from the arithmetic operation unit.

Figure 6:
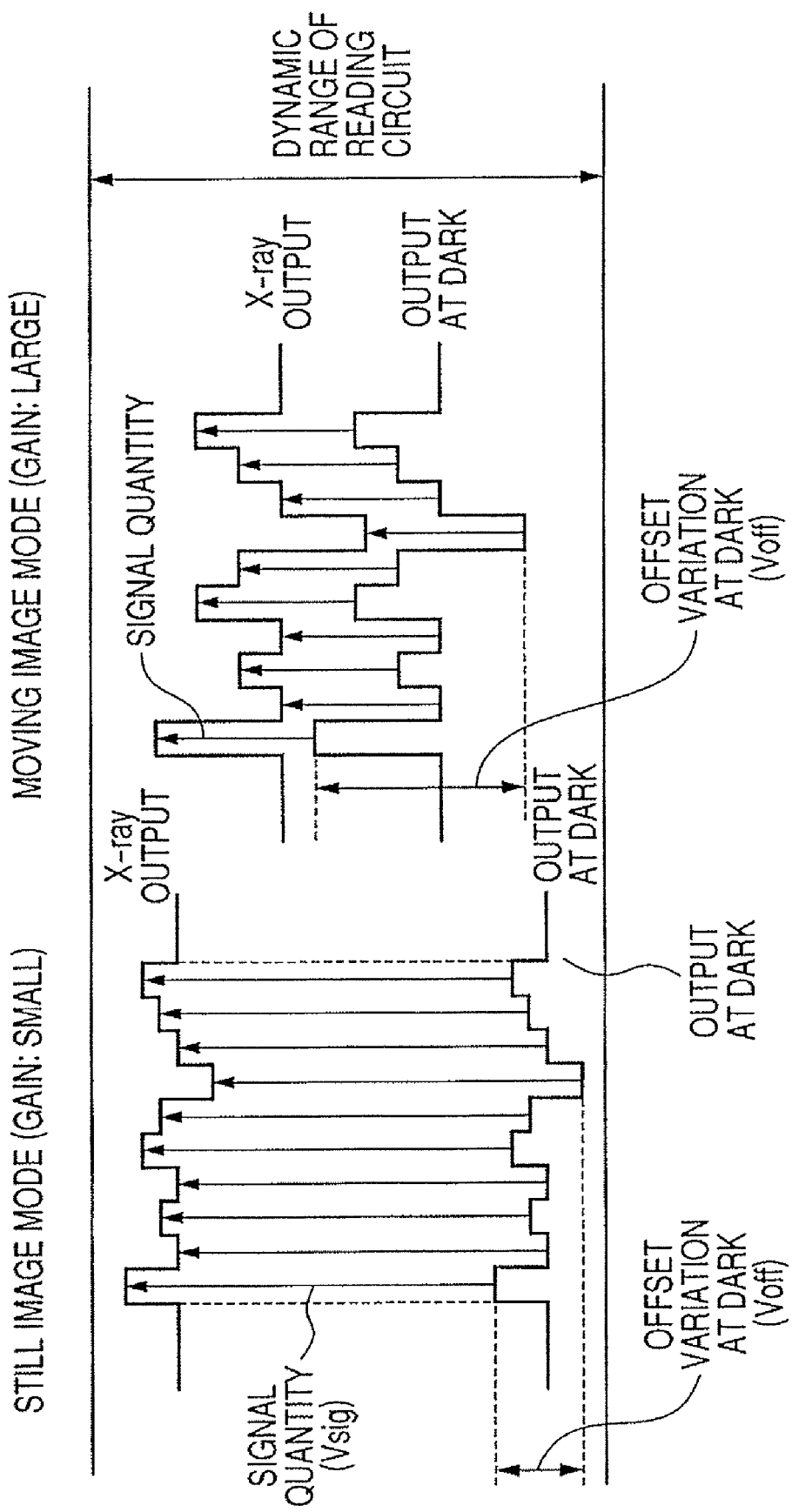
FIG. 6 is a schematic chart for explaining the effect that Embodiment 1 demonstrates.

FIG. 6 is a schematic chart for explaining the effect that the present embodiment demonstrates. In FIG. 6, at the left side, output at dark and output at light (X-ray output), in the case of radiographing in the still image radiographing mode, i.e., in the case where the gain is set at a low level, are represented; at the right side, output at dark and output at light (X-ray output), in the case of radiographing in moving image radiographing mode, i.e., in the case where the gain is set at a high level, are represented. In FIG. 6, the respective steps suggest pixels; the arrows indicate the quantity of a signal outputted due to X-rays. In FIG. 6, output for ten pixels is represented.

Figure 10:
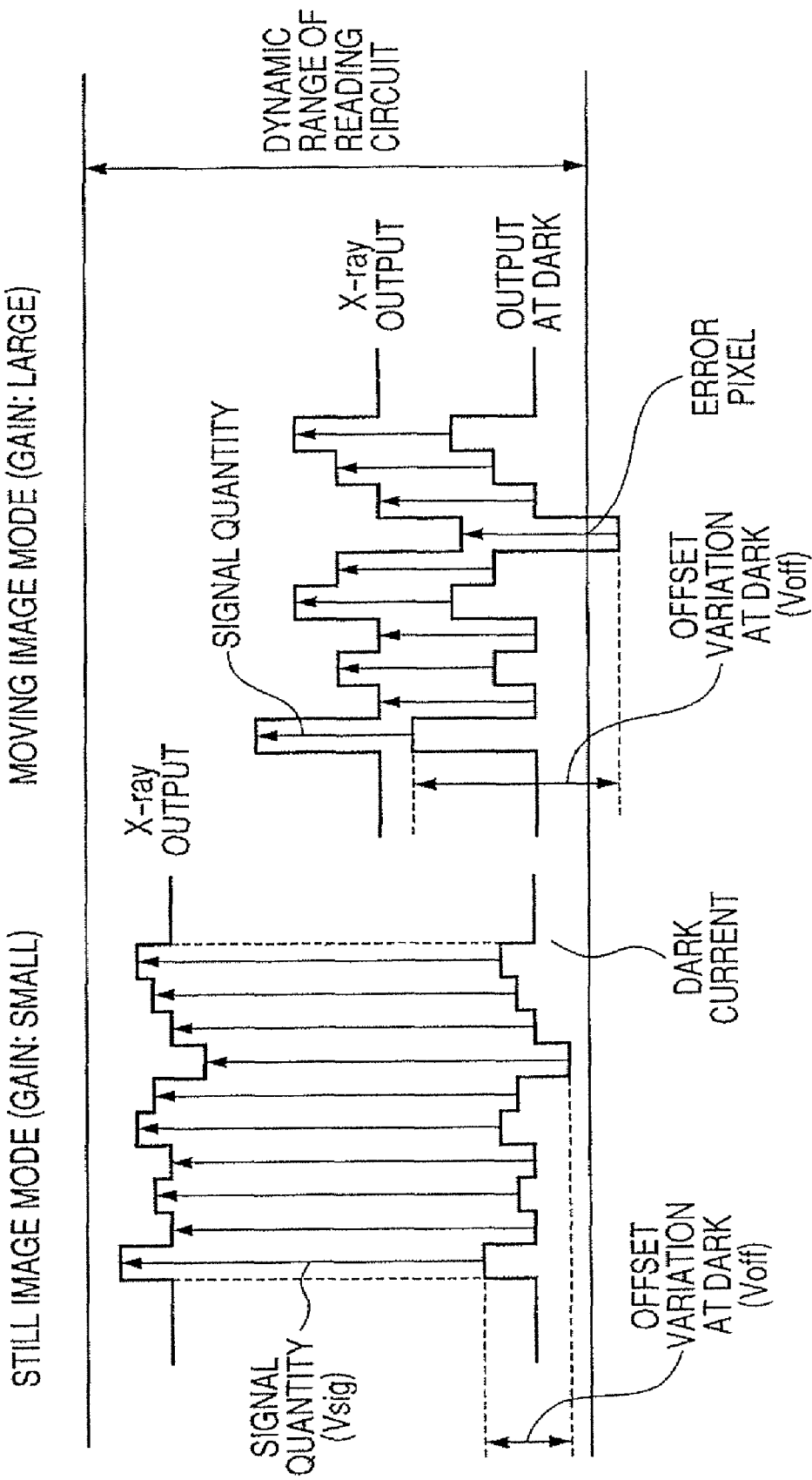
FIG. 10 is a characteristic graph for explaining conventional problems.

FIG. 6 differs from FIG. 10 in that, by varying the level of output at dark, the minimal value of the deviation of offset output at dark (Voff) falls within the dynamic range of the reading circuit unit 3. In this case, the maximal value of the output at light (X-ray output) in the moving image radiographing mode also falls within the dynamic range of the reading circuit unit 3. In other words, both the output at dark and the output at light fall within the dynamic range of the reading circuit unit 3, and the error as illustrated in FIG. 10 is not produced; therefore, the radiation image can be read correctly.

In addition, in FIG. 3, it is explained that the output of the AMP 18c (at the last stage) extends downward (−direction) with increase in the X-ray quantity. In contrast to FIG. 3, it is explained, in FIG. 6, that the output of the AMP 18c (at the last stage) extends upward (+direction) with increase in the X-ray quantity. However, whether the signal extends upward or downward is determined by signal carriers dealt with in the radiation imaging apparatus and the reading circuit unit 3 and setting for the respective circuits; therefore, it does not affect the nature of the present invention. In other words, in FIG. 6, it is explained that the minimal value of the output at dark and the maximal value of the X-ray output fall within the dynamic range; however, it is not appropriate, e.g., when, as in the case of the AMP 18c in FIG. 3, the output decreases with increase in the X-ray quantity. In this case, it is desirable, for the output at dark, to describe "the maximal value" instead of "the minimal value"; in contrast, it is desirable, for the output at light (the X-ray output), to describe "the minimal value" instead of "the maximal value". This also applies to Embodiment 2 and Embodiment 3 below.

In Embodiment 1, as represented in Table 1, the level of the output at dark of the AMP 18c in the reading circuit unit 3 depends on the reference electric potential VREF2 supplied to the AMP 18b and the reference electric potential VREF3 supplied to the AMP3. Accordingly, the reference electric potentials to be adjusted and varied such that the level of the output at dark of the AMP 18c falls within the dynamic level of the reading circuit unit 3 are VREF2 and VREF3.

Figure 7:
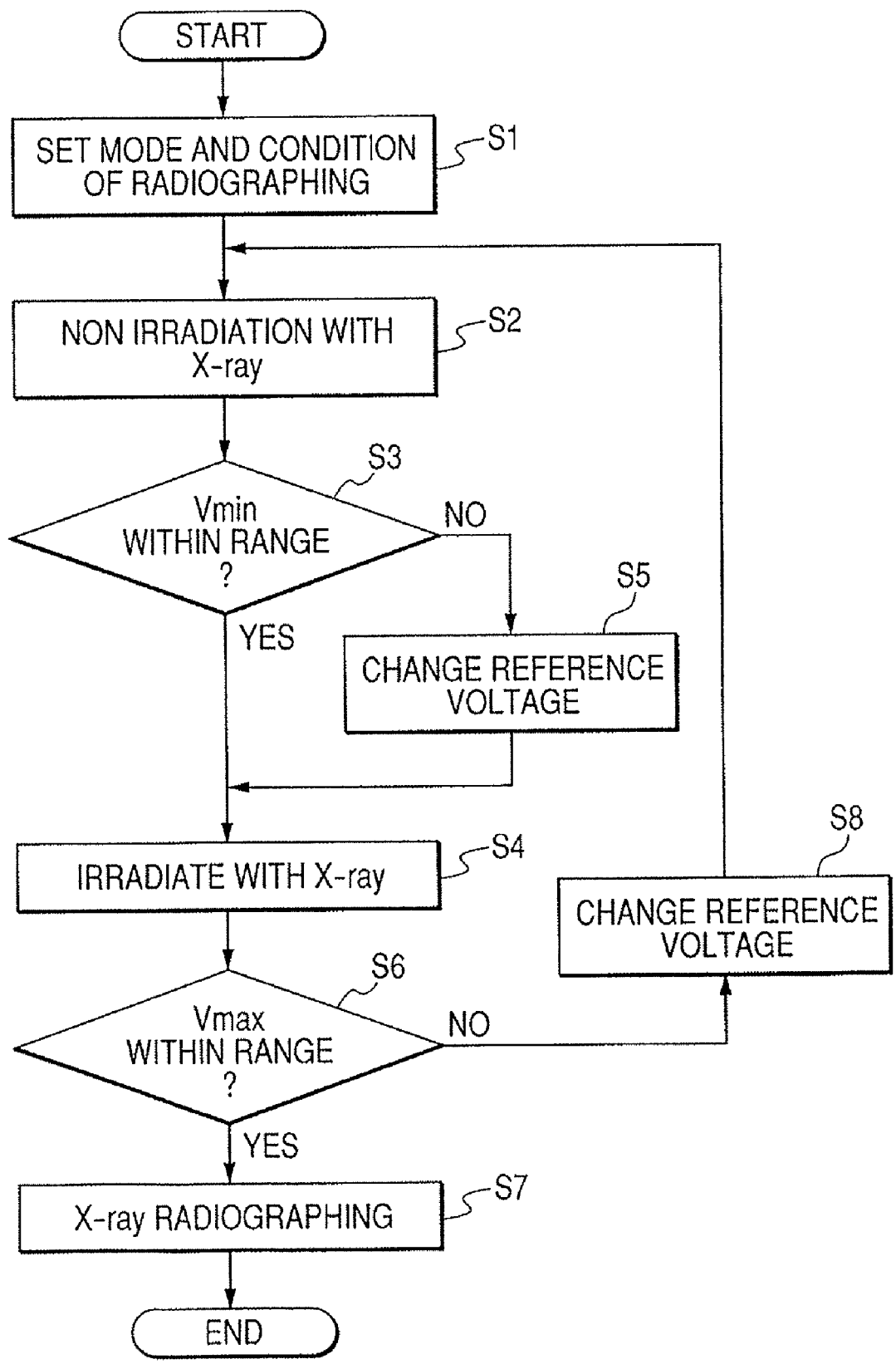
FIG. 7 is a flowchart illustrating an X-ray radiographing method according to Embodiment 1.

Next, an X-ray radiographing method according to Embodiment 1 will be explained. FIG. 7 is a flowchart illustrating the X-ray radiographing method according to Embodiment 1.

In the first place, in the X-ray imaging system, the X-ray imaging apparatus sets the radiographing mode and the radiographing condition, based on the control by the control unit (Step S1). The radiographing mode is divided roughly into the still image radiographing mode and the moving image radiographing mode. Each radiographing mode includes a pixel binding mode for binding two or more pixels in the horizontal direction or in the vertical direction, a pixel averaging mode for averaging the added pixels, and a pixel non-binding mode for binding no pixels. The number of pixels to be added may be two, three, four, or more. Mode setting is exemplified by a two-pixel binding mode for moving image radiographing, the pixel non-binding mode for still image radiographing, the pixel non-binding mode for moving image radiographing, and the like. Mode setting is exemplified also by a mixture mode in which the moving image radiographing mode and the still image radiographing mode are mixed. In the mixture mode, the moving image radiographing mode and the still image radiographing mode are alternately repeated. In general, with the continuous fluoroscopic image of a patient being monitored, the radiographing switch is turned ON so as to obtain a still image, at the time when a desired still image appears. In binding, the radiographing conditions are exemplified, e.g., by the parameters as represented in Table 2; however, the present invention is not limited thereto, and a great number of radiographing conditions may be included that correspond to the respective modes.

Subsequently, in the X-ray non-irradiation mode, the arithmetic operation unit 7 obtains an output at dark, based on the control by the control unit, and stores the output at dark in the memory 15 (Step S2).

Subsequently, based on the control by the control unit, the arithmetic operation unit 7 determines whether the minimal value of the output at dark falls within the dynamic ranges of the reading circuit unit 3 and the Analogue-Digital conversion unit 4 (Step S3).

When, in Step 3, determining that the minimal value of the output at dark deviates from at least one of the dynamic ranges of the reading circuit unit 3 and the Analogue-Digital conversion unit 4, the arithmetic operation unit 7 changes the respective reference electric potentials of the power source 6 (Step S5). In this case, the respective reference electric potentials are changed such that the DC level of the output at dark is raised.

In contrast, when, in Step 3, determining that the minimal value of the output at dark falls within the dynamic ranges of the reading circuit unit 3 and the Analogue-Digital conversion unit 4, the arithmetic operation unit 7 moves to Step S4.

Subsequently, in the X-ray imaging system, the X-ray source 10 irradiates X-rays onto the X-ray detecting circuit unit 1, based on the control by the control unit, and the arithmetic operation unit 7 obtains an output at light and then stores the output at light in the memory 15 (Step S4). It is desirable that, at this moment, no subject (object, i.e., a patient, normally) exists in front of the X-ray imaging apparatus and approximately homogeneous X-rays are irradiated onto the whole area of the X-ray imaging apparatus.

Subsequently, based on the control by the control unit, the arithmetic operation unit 7 determines whether the maximal value of the output at light falls within the dynamic ranges of the reading circuit unit 3 and the Analogue-Digital conversion unit 4 (Step S6).

When, in Step 6, determining that the maximal value of the output at light deviates from at least one of the dynamic ranges of the reading circuit unit 3 and the Analogue-Digital conversion unit 4, the arithmetic operation unit 7 changes the respective reference electric potentials of the power source 6 (Step S8). In this case, the respective reference electric potentials are changed such that the DC level of the output at light is lowered. As a result, the minimal value, of the output at dark, that has been obtained so as to reduce the output at dark may deviates from the dynamic range. Thus, after processing in Step S8, the arithmetic operation unit 7 returns to Step S2 so as to recheck the minimal value of the output at dark. In contrast, when, in Step 6, determining that the maximal value of the output at light falls within the dynamic ranges of the reading circuit unit 3 and the Analogue-Digital conversion unit 4, the arithmetic operation unit 7 moves to Step S7.

Subsequently, in the X-ray imaging system, the X-ray source 10 irradiates X-rays onto a subject in front of the X-ray detecting circuit unit 1 so as to implementing radiographing, based on the control by the control unit (Step S7). X-ray radiographing in the moving image radiographing mode is implemented for a long time, compared to that in the still image radiographing mode. In contrast, in the still image radiographing mode, X-ray irradiation is implemented the quantity of which corresponds to one image or approximately a number of images. In the mixture mode in which the moving image mode and the still image mode are combined, the radiographing is implemented such that the moving image mode and the still image mode are repeated alternately.

In the foregoing explanation, both the output at light and the output at dark include the process of changing the reference electric potentials; however, no reference electric potential may exist that is appropriate enough to be applied to both the output at light and the output at dark. In that case, because no optimal solution for the radiographing condition is given, another radiographing condition (e.g., reduction of X-ray quantity, reduction of the gain, or the like) is selected and the foregoing process is implemented again; however, in the flowchart in FIG. 7, the repetition process is omitted.

As described above, in Embodiment 1, the arithmetic operation unit 7 changes the respective signal reference electric potentials, which are supplied from the power source 6 to the reading circuit unit 3, such that both the output at light and the output at dark fall within the dynamic ranges of the reading circuit unit 3 and the Analogue-Digital conversion unit 4. In this situation, it is desirable that the dynamic range of the Analogue-Digital conversion unit 4 is the same as that of the reading circuit unit 3; however, both may differ from each other.

Moreover, in Embodiment 1, as an example, a circuit configuration has been explained in which, as illustrated in FIG. 1, the reference electric potentials are connected to the respective non-inversion input terminals of the operational amplifiers; however, the present invention is not limited to that circuit configuration, and any circuit configuration may be employed as long as it changes the DC level of the output at dark and the output at light.

Still moreover, the X-ray imaging apparatus in FIG. 1 incorporates charge-integration operational amplifiers; however, voltage-amplification operational amplifiers, such as inverting amplification circuits or non-inverting amplification circuits utilizing resistors, may be employed.

Furthermore, in FIG. 1, the timing generation unit 2, the Analogue-Digital conversion unit 4, the power source 6, and the arithmetic operation unit 7 are illustrated as separate constituent elements; however, for example, the foregoing elements may be mounted all together on a single printed board.

As explained heretofore, the present embodiment make it possible that, in accordance with a plurality of radiographing conditions such as the still image radiographing mode and the moving image radiographing mode, the outputs both in the irradiation period and in the non-irradiation period are made to fall within the dynamic range of the radiographing system, whereby an accurate, high-S/N-ratio X-ray radiographic image is obtained. In the present embodiment, the single X-ray imaging apparatus 20 can freely implement both still image radiographing and moving image radiographing; in the moving image radiographing in particular, even though the gain is raised or the pixel-binding drive is carried out, an excellent image can be obtained. Provision is made for an easy-to-use X-ray imaging system in which the single X-ray imaging apparatus 20 enables both a moving image and a still image to be radiographed.

Embodiment 2

In the present embodiment, a case will be explained in which, in the X-ray imaging apparatus in FIG. 1, VREF1 of the variable power source 11 is changed instead of VREF2 and VREF3. In other words, the arithmetic operation unit 7 changes VREF1 such that the maximal value or the minimal value, of the output, in the irradiation period and the maximal value or the minimal value, of the output, in the non-irradiation period fall within the dynamic ranges of the reading circuit unit 3 and the Analogue-Digital conversion unit 4.

In the case of the configuration illustrated in FIG. 1, the reference electric potential VREF1 is the output, of the AMP 18a, illustrated in FIG. 3; however, as illustrated associated with the AMP 18c, the last-stage output level at dark is not a function of VREF1. For example, in the case of the moving image radiographing mode, it is required to decrease the X-ray quantity in view of reduction of patient exposure; therefore, in order to ensure the signal quantity per frame, the gain of the AMP 18b is raised, by decreasing the integral capacitance for the AMP 18a of the reading circuit unit 3.

In contrast, in the case of the still image radiographing mode, in order to expose shadows of a lung field, a mediastinum, or an abdomen, radiographing is implemented with a condition in which the X-ray quantity is larger than that in the case of the moving image radiographing mode; thus, the integral capacitance for the AMP 18a is increased. As described above, due to the difference in the integral capacitances, the variation in the output at dark of the AMP 18a and the output at light (X-ray output) differ from each other, whereby the outputs may deviate from the dynamic range of the reading circuit unit 3 or the Analogue-Digital conversion unit 4. In that case, VREF1, i.e., the reference electric potential of AMP 1 is changed or adjusted.

However, in the configuration example illustrated in FIG. 1, the output of AMP 1 is normally outputted through the AMP18b, and AMP18c; therefore, it is not possible to input only the output of the AMP 18a to the arithmetic operation unit so as to implement a computation.

In Embodiment 2, in the case where, as in the case of the AMP 18a, the output cannot directly be received by the Analogue-Digital conversion unit 4, the optimal VREF1 is preliminarily computed. In other words, when the X-ray imaging apparatus 20 is shipped from the factory or installed at a customer, the respective optimal VREF1 values for a number of radiographing conditions are preliminarily computed through testing, and the computed VREF1 value is applied to the actual radiographing. The foregoing optimal VREF1 values computed through testing are stored in the memory 15 in the arithmetic operation unit 7.

Table 2 below represents examples of the radiographing conditions. The radiographing conditions include the X-ray irradiation condition and the condition for the X-ray imaging apparatus 20. The former include the tube voltage (V), the tube current (I), the X-ray pulse width (T), the distance (D) between the X-ray tube and the X-ray detecting circuit unit 1, the thickness (Th) of a filter for cutting low-energy components, materials, and the like. The latter include the bias power supply (Vs) for the X-ray imaging apparatus 20, the ON voltage (Vcom) of the TFT, the integral capacitance (Cf) for the first stage of the reading circuit unit 3, the gain (G) of the reading circuit unit 3, and the like.

| | X-RAY CONDITION | | | | | CONDITION FOR X-RAY IMAGING APPARATUS | | | |
|---|---|---|---|---|---|---|---|---|---|
| | TUBE VOLTAGE | TUBE CURRENT | PULSE | DISTANCE | FILTER | SENSOR | TFT(on) | INTEGRAL CAPACITANCE | GAIN |
| RADIOGRAPHING CONDITION 1 | 100 KVp | 20 mA | 10 ms | 180 cm | Al 20 mm | 10 V | 15 V | 2 pF | 4 |
| RADIOGRAPHING CONDITION 2 | 80 KVp | 80 mA | 100 ms | 180 cm | Al 20 mm | 10 V | 15 V | 3 pF | 1 |
| RADIOGRAPHING CONDITION 3 | 80 KVp | 80 mA | 50 ms | 180 cm | NOT APPLIED | 10 V | 15 V | 3 pF | 2 |
| RADIOGRAPHING CONDITION 4 | 60 KVp | 20 mA | 100 ms | 120 cm | NOT APPLIED | 12 V | 15 V | 1 pF | 2 |
| RADIOGRAPHING CONDITION 5 | — | — | — | — | — | — | — | — | — |
| RADIOGRAPHING CONDITION 6 | — | — | — | — | — | — | — | — | — |

As described above, according to the present embodiment, the VREF1 values in accordance with the radiographing conditions are preliminarily tested and determined. As a result, it is made possible that, in accordance with a plurality of radiographing conditions such as the still image radiographing mode and the moving image radiographing mode, the outputs both in the irradiation period and in the non-irradiation period are made to fall within the dynamic range of the radiographing system, whereby an accurate, high-S/N-ratio X-ray radiographic image is obtained. In the present embodiment, the single X-ray imaging apparatus 20 can freely implement both still image radiographing and moving image radiographing; in the moving image radiographing in particular, even though the gain is raised or the pixel-binding drive is carried out, an excellent image can be obtained. Provision is made for an easy-to-use X-ray imaging system in which the single X-ray imaging apparatus 20 enables both a moving image and a still image to be radiographed.

Embodiment 3

In the present embodiment, in the X-ray imaging apparatus in FIG. 1, the minimal value of the output at dark and the maximal value of the output at light are each made to be a function of radiographing parameters that configure the radiographing condition. The minimal value of the output at dark and the maximal value of the output at light, which have been made to be functions, are stored in the memory 15 in the arithmetic operation unit 7. Subsequently, the arithmetic operation unit 7 changes the reference electric potentials such that the maximal value of the output at light and the maximal value of the output at light, which have been made to be functions, fall within the dynamic ranges of the reading circuit unit 3 and the Analogue-Digital conversion unit 4.

The output at light (X-ray output) in the X-ray irradiation period and the output at dark in the X-ray non-irradiation period are functions of the radiographing parameters. For example, the X-ray output is proportional to the X-ray quantity, such as the tube current (I) and the X-ray pulse width (T), and the gain (G) of the reading circuit unit. In addition, the X-ray output is in inverse proportion to Cf and D squared. As described above, the X-ray output is a function of a parameter that represents a simple function and a parameter that represents a complicated function. The latter function can approximately be created based on experiments.

In contrast, it goes without saying that the output at dark has nothing to do with the X-ray condition; however, when being not a simple function of Vs or the gain G, the function of the output at dark is approximately created in advance, based on experiments.

Furthermore, because as many pixels as several millions exist, it takes extremely difficult work and very long time to approximate functions for all pixels that are configured by the X-ray detecting circuit unit 1 of the X-ray imaging apparatus 20; therefore, the approximation of functions is not practical, to say the least. It is only necessary to make a function only for the pixel, among all the pixels, at which the output at dark becomes smallest or the output at light becomes largest; by implementing the foregoing preparation, the outputs at all pixels, the output levels at which are between the smallest and the largest level, fall within the dynamic range. However, it should be noted that, in the case where the radiographing condition is changed, the pixel at which the output at dark is smallest or the output at light is largest is not always the same. The coordinate information, on pixels, that are necessary for respective radiographing conditions may be stored in the memory 15.

As described above, according to the present embodiment, the minimal value of the output at dark and the maximal value of the output at light are each made to be a function of radiographing parameters that configure the radiographing condition. As a result, it is made possible that, in accordance with a plurality of radiographing conditions such as the still image radiographing mode and the moving image radiographing mode, the outputs both in the irradiation period and in the non-irradiation period are made to fall within the dynamic range of the radiographing system, whereby an accurate, high-S/N-ratio X-ray radiographic image is obtained. In the present embodiment, the single X-ray imaging apparatus 20 can freely implement both still image radiographing and moving image radiographing; in the moving image radiographing in particular, even though the gain is raised or the pixel-binding drive is carried out, an excellent image can be obtained. Provision is made for an easy-to-use X-ray imaging system in which the single X-ray imaging apparatus 20 enables both a moving image and a still image to be radiographed.

Embodiment 4

In the present embodiment, a case will be explained in which, in the X-ray imaging apparatus in FIG. 1, the power-supply voltage of the reading circuit unit 3 is changed by the variable power source 14.

The dynamic range of the reading circuit unit 3 depends on the power-supply voltage and is determined by the circuit configurations of the input stage and the output stage. The dynamic range of an operational amplifier was smaller by 1 V than the power-supply voltage; however, in recent years, so-called rail-to-rail operational amplifiers have been designed in which the output and the input can swing from one end of the range of the power-supply voltage to the other. With this method, a dynamic range the same as the power-supply voltage can be ensured.

Figure 8:
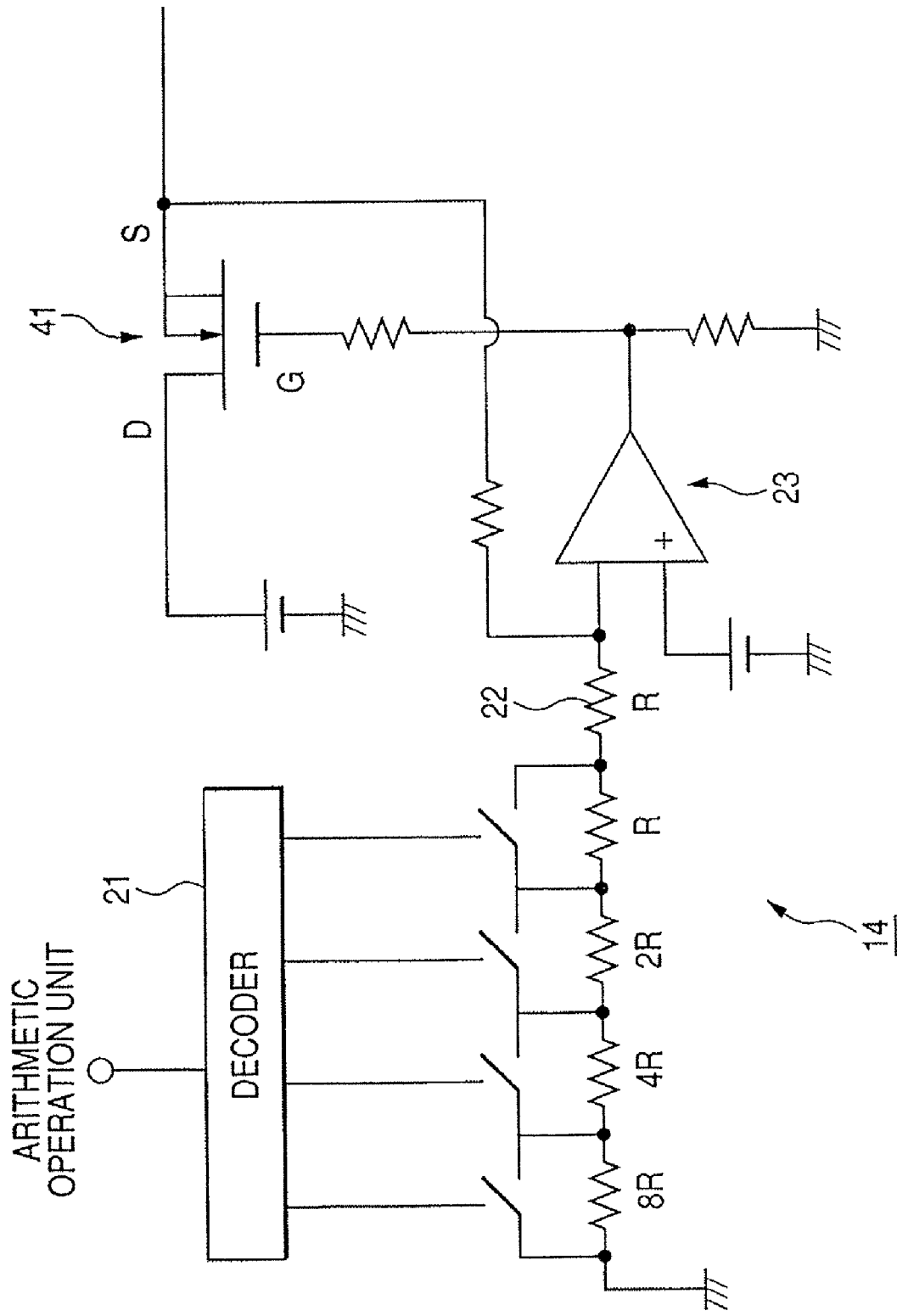
FIG. 8 is a circuit configuration diagram for explaining Embodiment 3.

FIG. 8, a circuit configuration for explaining the present embodiment, is the circuit configuration of the variable power source 14 for changing the power-source voltage for the reading circuit unit 3, based on a control signal from the arithmetic operation unit 7.

What differs from FIG. 4 is that a MOS transistor 41 is connected to the operational amplifier 23. The circuit configuration, as illustrated in FIG. 4, for forming a reference electric potential hardly make a current flow because, in general, the input impedance of the operational amplifier is high. However, because the reading circuit unit 3 is configured of a great number of operational amplifiers, the power supply unit for the reading circuit unit 3 is required to have ability of making a considerable current flow. The MOS transistor 41 is a so-called power MOS transistor. The voltage source connected to the drain terminal (D) is required to have ability of supplying the reading circuit unit 3 with a necessary current. In the circuit configuration illustrated in FIG. 8, 16 power-supply voltages can be selected.

By controlling the variable power source 14 of the power source 6, thereby changing the power-supply voltage for the reading circuit unit 3, the dynamic range of the reading circuit unit 3 can be changed. In the present embodiment, the power-supply voltage of the reading circuit unit 3 is changed such that the minimal value of the output at dark and the maximal value of the output at light (X-ray output) fall within the dynamic range.

As described above, according to the present embodiment, by adjusting the power-supply voltage of the reading circuit unit 3, the dynamic range of the reading circuit unit 3 is changed. As a result, it is made possible that, in accordance with a plurality of radiographing conditions such as the still image radiographing mode and the moving image radiographing mode, the outputs both in the irradiation period and in the non-irradiation period are made to fall within the dynamic range of the radiographing system, whereby an accurate, high-S/N-ratio X-ray radiographic image is obtained. In the present embodiment, the single X-ray imaging apparatus 20 can freely implement both still image radiographing and moving image radiographing; in the moving image radiographing in particular, even though the gain is raised or the pixel-binding drive is carried out, an excellent image can be obtained. Provision is made for an easy-to-use X-ray imaging system in which the single X-ray imaging apparatus 20 enables both a moving image and a still image to be radiographed.

Other Embodiments to which the Present Invention is Applied

The functions of the constituent elements (the control unit and the arithmetic operation unit (excluding the memory 15)) that configure the X-ray imaging systems according to the foregoing embodiments can be realized through the operation of a program stored in the RAM and the ROM of a computer. Similarly, the respective steps (Steps S1 to S8 in FIG. 7) in the X-ray radiographing method can be realized through the operation of a program stored in the RAM and the ROM of a computer. The present invention includes the program and a storage medium in which the program is stored and data in which can be read by a computer.

Specifically, the program is stored in a storage medium such as a CD-ROM, or the program is provided to a computer, by way of any one of various kinds of transmission media. As a storage medium, in addition to a CD-ROM, for storing the program, a flexible disk, a hard disk, a magnetic tape, a magneto-optical disk, a nonvolatile memory card, or the like can be employed. Meanwhile, as the transmission medium for the program, a communication medium, in a computer network system, for propagating, as a carrier wave, program information and supplying the program information to the computer can be utilized. Here, the computer network signifies a LAN, a WAN such as the Internet, a wireless communication network, and the like; the communication medium signifies a wired channel such as an optical fiber, a wireless channel, and the like.

Additionally, the program included in the present invention is not limited to a program that is supplied to a computer and then implemented by the computer, so that the functions in the foregoing embodiments are realized. For example, the present invention includes a program that cooperates with an OS (Operating System) working on a computer, another application software, or the like, so that the functions in the foregoing embodiments are realized. Moreover, the present invention includes a program all or part of which is implemented by a function expansion board for a computer or a function expansion unit, so that the functions in the foregoing embodiments are realized.

Figure 9:
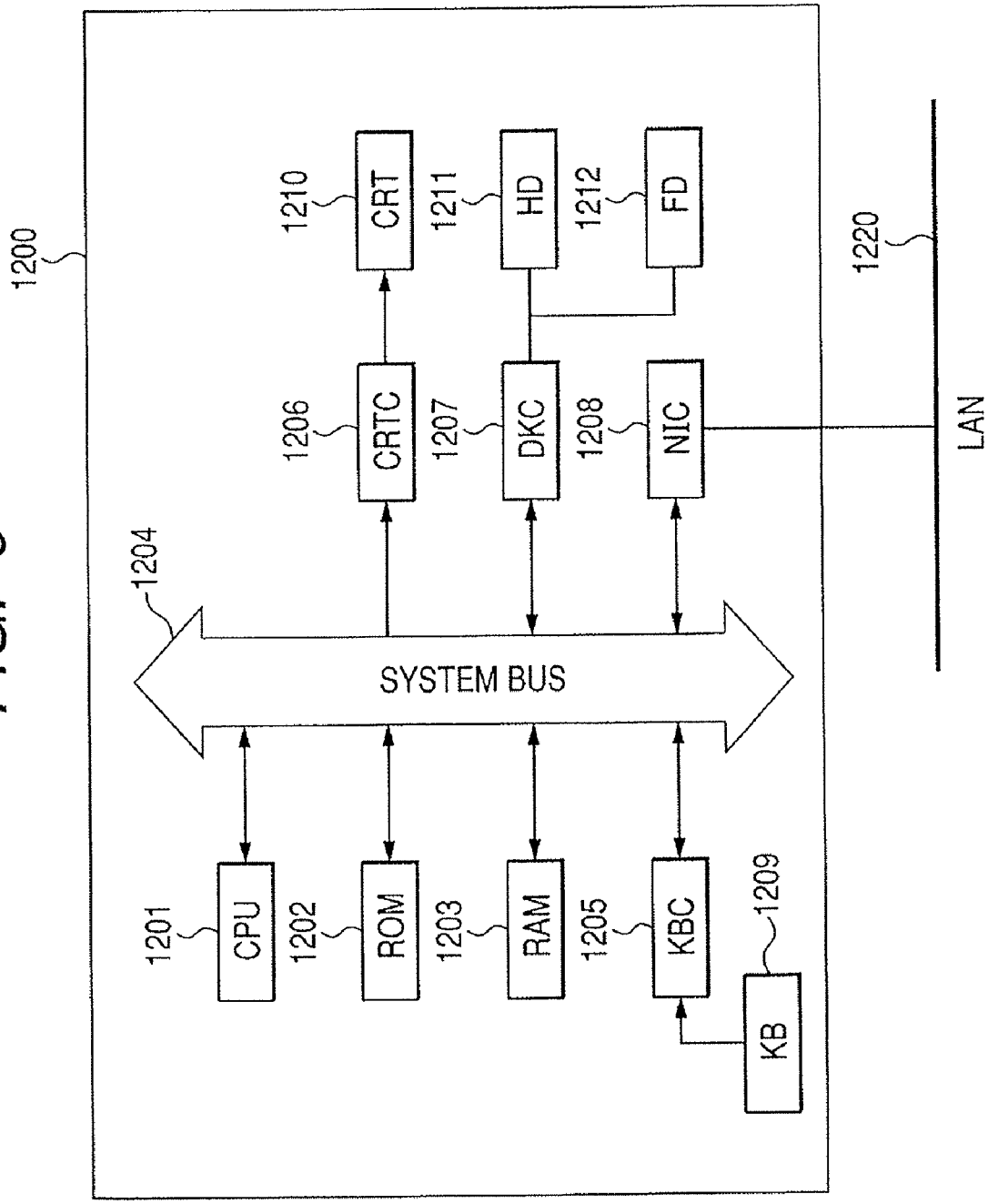
FIG. 9 is a schematic diagram illustrating the internal configuration of a personal user terminal system.

For example, FIG. 9 is a schematic diagram representing the internal configuration of a personal user terminal system. In FIG. 9, Reference Numeral 1200 denotes a personal computer (PC) including a CPU 1201. The PC 1200 implements device control software stored in a ROM 1202 or a hard disk (HD) 1211, or supplied from a flexible disk drive (FD) 1212. The PC 1200 integrally controls devices connected to a system bus 1204.

Based on a program stored in the CPU 1201 of the PC 1200, the ROM 1202, or the hard disk (HD) 1211, the procedures in Steps S1 to S8, in FIG. 7, according to Embodiment 1 are realized.

Reference Numeral 1203 denotes a RAM that functions as the main memory and the work area for the CPU 1201. Reference Numeral 1205 denotes a key board controller (KBC) that controls an instruction input from a key board (KB) 1209, an unillustrated device, or the like.

Reference Numeral 1206 denotes a CRT controller (CRTC) that controls the display on a CRT display (CRT) 1210. Reference Numeral 1207 denotes a disk controller (DKC). The DKC 1207 controls the access of the CPU 1201 to the hard disk (HD) 1211 and the flexible disk (FD) 1212 that store boot programs, a plurality of applications, editing files, user files, network management programs, and the like. Here, a "boot program" signifies a startup program that starts the implementation (operation) of the hardware and the software for a personal computer.

Reference Numeral 1208 denotes a network interface card (NIC) for, through a LAN 1220, implementing interactive reception and transmission of data between the CPU 1201 and a network printer, another network apparatus, or another PC.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-288418, filed Sep. 30, 2005 which is hereby incorporated by reference herein in its entirety.

What is claimed is:

1. A radiation imaging apparatus comprising:
a reading circuit unit for reading an electric signal from a radiation detecting unit that detects radiations;
a power source for controlling a voltage applied to the reading circuit unit; and
a power control unit for controlling the power source,
wherein the radiation imaging apparatus has a plurality of radiographing modes and, the power control unit controls the power source to control the voltage to be applied in accordance with the plurality of radiographing modes, such that both the electric signal in an irradiation period and the electric signal in a non-irradiation period fall within the dynamic range of the reading circuit unit in each of the radiographing modes.

2. The radiation imaging apparatus according to claim 1, wherein the power control unit controls the power source to control the voltage to be applied in accordance with the plurality of radiographing modes, such that both the maximal or the minimal value of the electric signal in irradiation period and the minimal or the maximal value of the electric signal in a non-irradiation period fall within the dynamic range of the reading circuit unit in each of the radio graphing modes.

3. The radiation imaging apparatus according to claim 1, further comprising an analogue-to-digital converter for applying analogue-to-digital conversion to the electric signal from the reading circuit unit, wherein the power control unit controls the power source to control the voltage to be applied in accordance with the plurality of radiographing modes, such that both the electric signal in an irradiation period and the electric signal in a non-irradiation period fall within the dynamic ranges of the reading circuit unit and the analogue-to-digital converter in each of the radiographing modes.

4. The radiation imaging apparatus according to claim 1, wherein the reading circuit unit includes an amplifier whose amplification factor can be changed in accordance with the plurality of radiographing modes, and the power control unit controls the power source so as to control a reference voltage applied, as the voltage to be applied, to the amplifier, in accordance with the plurality of radiographing modes.

5. The radiation imaging apparatus according to claim 1, wherein the reading circuit unit includes an amplifier whose dynamic range can be changed in accordance with a power-supply voltage to be applied, and the power control unit controls the power source so as to control the power-supply voltage to be applied, in accordance with the plurality of radiographing modes.

6. The radiation imaging apparatus according to claim 1, wherein, when determining, before radiographing, that the electric signal in the irradiation period or the electric signal in the non-irradiation period deviate from the dynamic range, the power control unit computes an appropriate value, of the voltage to be applied, with which the electric signals fall within the dynamic range, and controls the power source so as to control the voltage to be applied, based on the appropriate value.

7. The radiation imaging apparatus according to claim 1, wherein the radiation detecting unit has a plurality of pixels arranged on a substrate, and the pixel includes a conversion element for convening radiations into an electric signal and a switching element for selecting said conversion element.

8. The radiation imaging apparatus according to claim 1, where the radiographing mode has a moving image mode and a still image mode, both the moving image mode and the still image mode each has a pixel binding mode for binding at least two or more pixels in the horizontal direction or in the vertical direction, or a pixel averaging mode for averaging the added pixels and a pixel non-binding mode for binding no pixels.

9. The radiation imaging apparatus according to claim 1, wherein the power control unit includes a plurality of variable power sources for supplying voltage to be applied to the reading circuit.

10. The radiation imaging apparatus according to claim 1, wherein the power control unit further includes a power source for supplying a sensor bias to the radiation detecting unit, and a power source for supplying a voltage to a driving circuit unit for supplying a driving signal to the radiation detecting unit.

11. A radiation imaging system comprising:
a radiation source for irradiating radiations;
a radiation detecting unit for detecting the radiations;
a reading circuit unit for reading an electric signal from the radiation detecting unit;
a power source for controlling a voltage applied to the reading circuit unit; and
a power control unit for controlling the power source,
wherein the radiation imaging system has a plurality of radiographing modes and, the power control unit controls the power source to control the voltage to be applied in accordance with the plurality of radiographing modes, such that both the electric signal in an irradiation period and the electric signal in a non-irradiation period fall within the dynamic range of the reading circuit unit in each of the radiographing modes.

12. A program embodied on a computer-readable medium wherein a computer implements a procedure in which, in accordance with a plurality of radiographing modes, a voltage, applied to a reading circuit unit, that is controlled by a power source is controlled such that, in the plurality radiographing modes, both an electric signal that, in irradiation period, is detected by a radiation detecting apparatus and read by a reading circuit unit and an electric signal that, in a non-irradiation period, is detected by the radiation detecting apparatus and read by the reading circuit unit fall within the dynamic range of the reading circuit unit.

* * * * *

UNITED STATES PATENT AND TRADEMARK OFFICE
CERTIFICATE OF CORRECTION

PATENT NO. : 7,381,963 B2
APPLICATION NO. : 11/535726
DATED : June 3, 2008
INVENTOR(S) : Tadao Endo et al.

It is certified that error appears in the above-identified patent and that said Letters Patent is hereby corrected as shown below:

COLUMN 2:

Line 1, "were" should read --was--; and
    Line 33, "adjusting" should read --adjust--.

COLUMN 4:

Line 13, "plurality" should read --plurality of--;
    Line 30, "a irradiation" should read --an irradiation--;
    Line 39, "plurality" should read --plurality of--;
    Line 40, "a irradiation" should read --an irradiation--; and
    Line 47, "make" should read --makes--.

COLUMN 8:

Line 67, "AMP3)" should read --AMP3")--.

COLUMN 9:

Line 8, "REF2=2V," should read --VREF2=2V,--; and
    Line 14, "is" should read --are--.

COLUMN 12:

Line 8, "Step 3," should read --Step S3,--.
    Line 17, "Step 3," should read --Step S3,--.
    Line 36, "Step 6," should read --Step S6,--.
    Line 45, "deviates" should read --deviate--.
    Line 48, "Step 6," should read --Step S6,--.
    Line 56, "implementing" should read --implement--.

COLUMN 13:

Line 44, "make" should read --makes--.

UNITED STATES PATENT AND TRADEMARK OFFICE
CERTIFICATE OF CORRECTION

PATENT NO. : 7,381,963 B2
APPLICATION NO. : 11/535726
DATED : June 3, 2008
INVENTOR(S) : Tadao Endo et al.

It is certified that error appears in the above-identified patent and that said Letters Patent is hereby corrected as shown below:

COLUMN 15:

Line 51, "maximal value of the output at light" should read --minimal value of the output at dark--.

COLUMN 17:

Line 21, "make" should read --makes--.

COLUMN 18:

Line 7, "in" should be deleted.

COLUMN 19:

Line 18, "modes and," should read --modes, and--; and
Line 28, "thatboth" should read --that both--.

COLUMN 20:

Line 40, "modes and," should read --modes, and--; and
Line 53, "radiographing" should read --radiographing of--; and "in" should read --in an--.

Signed and Sealed this

Thirtieth Day of December, 2008

JON W. DUDAS
*Director of the United States Patent and Trademark Office*